US007831208B2

(12) United States Patent
Nelson et al.

(10) Patent No.: US 7,831,208 B2
(45) Date of Patent: Nov. 9, 2010

(54) WIRELESS MOBILE PHONE HAVING ENCODED DATA ENTRY FACILITIES

(75) Inventors: Jonathan O. Nelson, Kirkland, WA (US); Walter G. Bright, Kirkland, WA (US); G. Eric Engstrom, Kirkland, WA (US); Tyrol R. Graham, Seattle, WA (US)

(73) Assignee: Varia Holdings LLC, Brooklyn, NY (US)

( * ) Notice: Subject to any disclaimer, the term of this patent is extended or adjusted under 35 U.S.C. 154(b) by 1173 days.

(21) Appl. No.: 09/975,287

(22) Filed: Oct. 10, 2001

(65) Prior Publication Data
US 2002/0160818 A1    Oct. 31, 2002

Related U.S. Application Data

(63) Continuation-in-part of application No. 09/767,587, filed on Jan. 22, 2001, now Pat. No. 6,418,323.

(51) Int. Cl.
*H04B 1/00* (2006.01)
(52) U.S. Cl. ............. 455/72; 455/66.1; 455/414.4; 455/414.2; 455/575.1; 710/73; 710/65
(58) Field of Classification Search ............. 455/466, 455/72, 566, 128, 414.1, 557.1, 550.1, 414.2, 455/414.4, 66.1; 341/66, 22, 106; 710/73, 710/65
See application file for complete search history.

(56) References Cited

U.S. PATENT DOCUMENTS

| | | | | |
|---|---|---|---|---|
| 4,630,208 A * | 12/1986 | Le Pechon | ................... | 701/200 |
| 5,095,179 A * | 3/1992 | Ho | ................... | 178/2 B |
| 5,126,739 A * | 6/1992 | Whiting et al. | .......... | 341/106 |
| 5,263,195 A | 11/1993 | Panther et al. | | |
| 5,297,247 A * | 3/1994 | Kan | ................... | 340/7.56 |
| 5,418,903 A * | 5/1995 | Lee | ................... | 345/581 |
| 5,455,861 A * | 10/1995 | Faucher et al. | .......... | 380/266 |
| 5,721,783 A * | 2/1998 | Anderson | ................ | 381/328 |
| 5,966,671 A * | 10/1999 | Mitchell et al. | ........ | 455/550.1 |
| 6,295,441 B1 * | 9/2001 | Bjorkengren | ............ | 455/566 |
| 6,631,274 B1 * | 10/2003 | Keshavachar | ............ | 455/466 |

(Continued)

FOREIGN PATENT DOCUMENTS

JP    09107568 A  *  4/1997

(Continued)

*Primary Examiner*—Vincent P Harper
*Assistant Examiner*—Fred A Casca
(74) *Attorney, Agent, or Firm*—Schwabe, Williamson & Wyatt P.C.

(57) ABSTRACT

A wireless mobile phone is provided with one or more buttons and complementary logic to facilitate entry of encoded representations of a variable length encoding scheme of alphanumeric data. As a result, a user may use the provided facilities to engage in non-verbal communication for sensitive subject matters in the middle of a call. In one embodiment, the encoded representations are Morse codes. In another embodiment, the encoded representations are custom designed. In one embodiment, the complementary logic further facilitates echoing on a display, alphanumeric data corresponding to any entered encoded representations. Additionally, each of the code entry buttons includes one or more light emitting diodes (LEDs), and the LEDs are lit to visually echo the encoded representations of the variable length encoding scheme of letters, numbers or punctuations entered through a standard input keypad.

40 Claims, 5 Drawing Sheets

U.S. PATENT DOCUMENTS

| | | | |
|---|---|---|---|
| 6,732,358 B1 * | 5/2004 | Siefert | 717/173 |
| 6,850,782 B2 * | 2/2005 | Bright et al. | 455/567 |
| 7,330,876 B1 * | 2/2008 | Rawat et al. | 709/205 |
| 2001/0004588 A1 * | 6/2001 | Hong | 455/404 |
| 2002/0002643 A1 * | 1/2002 | Yamamoto et al. | 710/73 |

FOREIGN PATENT DOCUMENTS

| | | |
|---|---|---|
| JP | 40-9248315 | 9/1997 |

* cited by examiner

WIRELESS MOBILE PHONE HAVING ENCODED DATA ENTRY FACILITIES

RELATED APPLICATION

The present application is a continuation-in-part application to U.S. application Ser. No. 09/767,587, now U.S. Pat. No. 6,418,323 entitled "A Wireless Mobile Phone With Morse Code and Related Capabilities", and filed on Jan. 22, 2001

BACKGROUND OF THE INVENTION

1. Field of the Invention

The present invention relates to the field of wireless mobile phones. More specifically, the present invention relates to complementary features that enhance the usability of wireless mobile phones.

2. Background Information

Advances in integrated circuit and telecommunication technology have led to the development and wide spread adoption of wireless mobile client devices, in particular, wireless mobile telephones. Wireless mobile phones offer the advantage of enabling their users to be communicatively reachable by their business associates, friends and family members, wherever the users may be, as long as they are within the reach of the service networks. Thus, even non-professionals are increasingly dependent on their wireless mobile phones to meet their communication needs.

With increased usage and reliance, often times, wireless mobile phone users would find themselves in the dilemma of having to engage in potentially sensitive conversations in a setting that is less than desirable, privacy-wise. For examples, a user may find himself/herself having to engage in an urgent personal or business conversation at a bus stop while waiting for the next bus, or at an airport terminal while waiting to board his/her flight. Under the prior art, a user may have to elect to continue the private/sensitive conversation in a less than private manner, switch to another form of communication, such as email, or delay the communication. Each of these options has disadvantages. Electing to proceed with the conversation in a less than private manner may unduly expose private/sensitive information to the public. Switching communication form is inconvenient. That is true even if the user is in possession of a wireless mobile phone capable of sending and receiving emails. The reason being, any switching would likely at a minimum, disrupts the continuity of the communication.

Therefore, a more user-friendly approach to accommodating privacy sensitive communication is desired. As will be described in detail bellow, the present invention provides a data entry method that improves the ease of data entry in general, and the ease of conducting privacy sensitive communication in particular.

Note: The term "wireless mobile phone" as used in herein (in the specification and in the claims) refers to the class of telephone devices equipped to enable a user to make and receive calls wirelessly, notwithstanding the user's movement, as long as the user is within the communication reach of a service or base station. The term "wireless mobile phone" is to include the analog subclass as well as the digital subclass (of all signaling protocols).

SUMMARY OF THE INVENTION

A wireless mobile phone is provided with one or more extra buttons (in addition to the standard input keypad) and complementary logic to facilitate entry of alphanumeric data via entry of their variable length encoded representations.

In one embodiment, the variable length encoded representations are Morse codes comprising combinations of "dit" and "dah" encoding. In another embodiment, the variable length encoded representations are custom designed codes comprising modified as well as newly formed "dit" and "dah" encoding combinations. In yet other embodiments, multiple variable length encoding schemes are supported with one of the supported encoding schemes selectable to be the operational encoding scheme.

In one embodiment, only one button is provided, with the "dit" and "dah" encoding being differentiated based on the duration the button is depressed. In another embodiment, two buttons are provided, one for the "dit" encoding, and the other for the "dah" encoding. In yet another embodiment, a third button is provided to facilitate quick entry of a frequently used encoding, e.g. the encoding for a "space".

In one application, the entered alphanumeric data form part of a textual message to be transmitted. As a result, a user may more naturally use the provided facilities to engage in non-verbal communication for sensitive subject matters in the middle of a call. In another application, the entered alphanumeric data form part of an address book entry.

In one embodiment, the complementary logic further facilitates echoing on a local display, alphanumeric data corresponding to the entered encoded representations.

Additionally, in various embodiments, each of the code entry buttons includes one or more light emitting diodes (LEDs), and the LEDs are lit to visually echo the encoded representations of letters, numbers and punctuations entered through the standard input keypad, in accordance with the selected operational encoding scheme.

Further, in one embodiment, the wireless mobile phone includes an adapter interface designed to be able to have a device capable of vibrating removably attached to the wireless mobile phone to facilitate the complementary logic to vibrationally output a text message received, through vibrational manifestation of the text message in encoded representations per the selected operational encoding scheme.

Note: The term alphanumeric data as used in the present application, including the claims, include letters, numbers, punctuations, symbols, and/or words/phrases formed with letters, numbers, punctuations and/or symbols.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. For purposes of explanation, specific numbers, materials and configurations are set forth in order to provide a thorough understanding of the present invention. However, the present invention may be practiced with only some of the described aspects, and without the specific details. In other instances, well-known features are omitted or simplified in order not to obscure the present invention.

The phrase "in one embodiment" will be used repeatedly, however the phrase does not necessarily refer to the same embodiment, although it may. Further, the terms "comprising", "having", "including" and the like are synonymous.

Figure 1A:
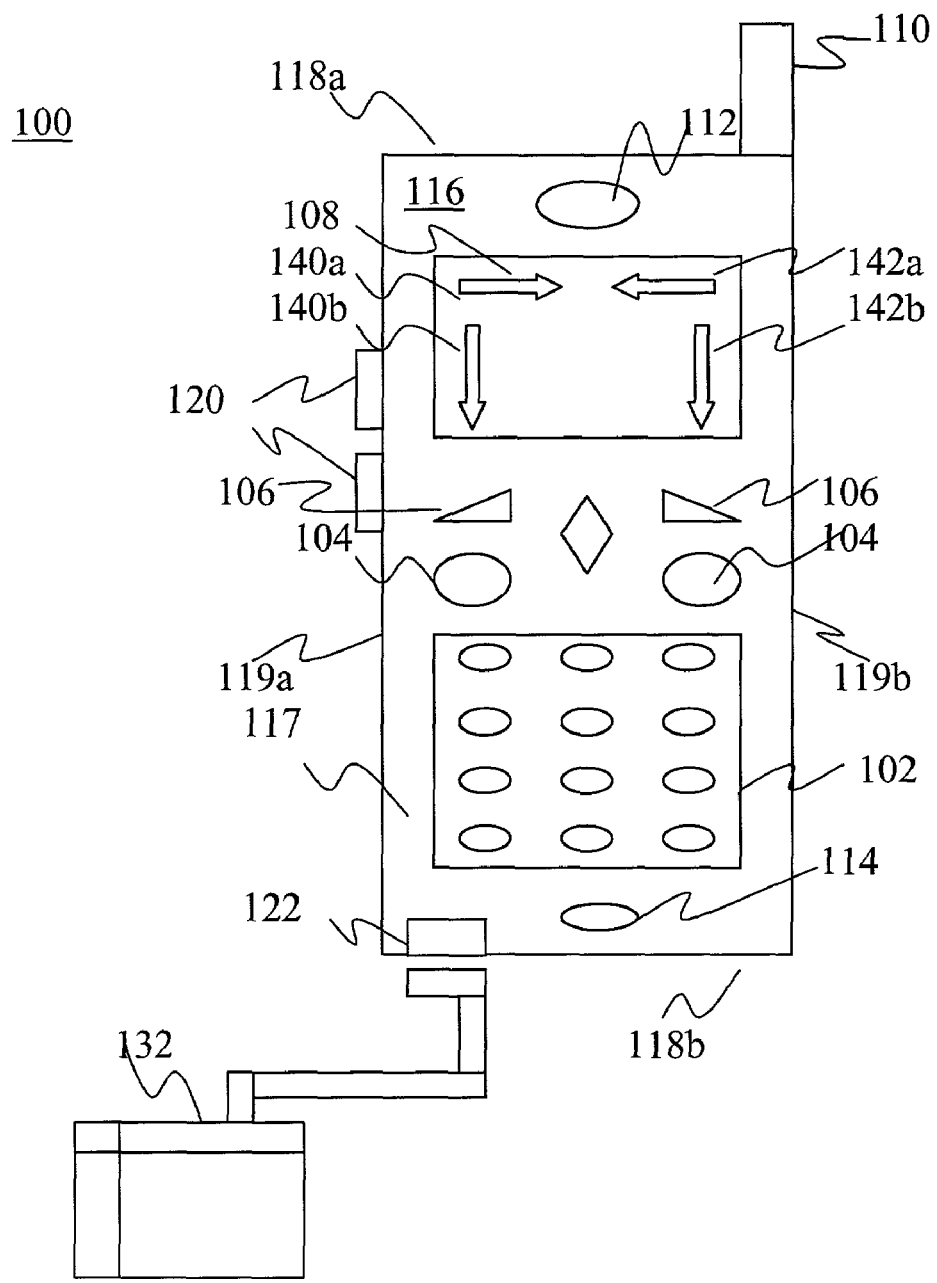
FIGS. 1a-1b illustrate a wireless mobile phone of the present invention, incorporated with encoded data entry facilities in accordance with the present invention, in accordance with two embodiments.
Figure 1B:
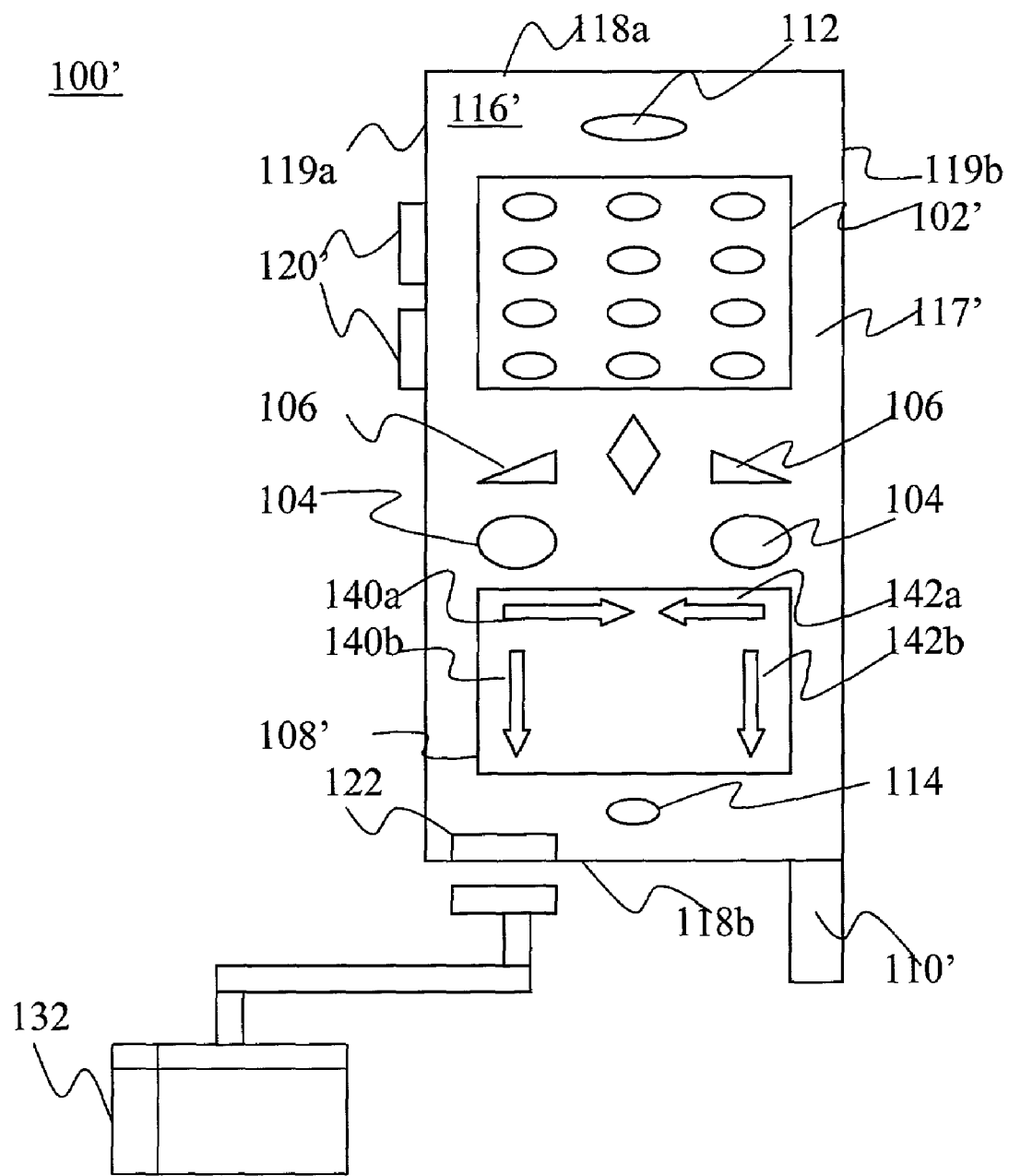

Referring now to FIGS. 1a-1b, wherein two embodiments of a wireless mobile phone 100 and 100', incorporated with the teachings of the present invention are shown. As illustrated, in accordance with the present invention, wireless mobile phone 100/100' is provided with two extra buttons 120 and complementary logic (shown as ref. 330 in FIG. 3) to facilitate a user of phone 100/100' to enter alphanumeric data, e.g. data that are part of a text message to be transmitted or data to be stored into an address book inside phone 100/100'. More specifically, buttons 120 in conjunction with the complementary logic facilitate a user in entering alphanumeric data through entry of their variable length encoded representations of an operational encoding scheme. Thereafter, the user may cause the entered alphanumeric data (internally represented in e.g. ASCII or other fixed length binary representations) to be sent and/or stored. [ASCII=American Standard Coding for Information Interchange.]

For the illustrated embodiment, one of buttons 120 is provided to allow a user to enter a first basis code, while the other is provided to allow the user to enter a second basis code (the "dit" and "dah" representations, in Morse terminology). The "dit" and "dah" representations entered are interpreted in accordance with the selected operational encoding scheme. In one embodiment, the encoding scheme may be a selected one of a custom encoding scheme (Tables I-IV) or the Morse codes (Tables V-VII). Note that the example custom codes reserve the two shortest code "dit" and "dah" for two user programmable words or phrases, such as yes/no, morning/evening, sweetie/jerk. Entry of the user preferred words or phrases for the two shortest codes may be facilitated in like manners as other system preferences. Further, example custom codes remapped some of the Morse codes, as well as introduced other new codes in anticipation of certain usage characteristics by a particular type of user populations. Custom codes that are different from the Morse codes are shown in italics in Table I-IV. In like manner, selection of either the example custom codes or the Morse codes as the operational codes may be facilitated as other operational preferences. In alternate embodiments, more than two encoding schemes may be supported.

The above described encoded data entry facilities may be employed in particular during a call, thereby enabling the user to conduct all or a portion of a call in a non-audible and more private manner. The encoded data entry may also be employed to improve entering data to be stored into a database or a file of phone 100/100', such as an address book.

TABLE I

Custom Codes for Special Words/Phrases

| Special Words/Phrases | Custom Codes |
|---|---|
| Programmable word/phrase one, e.g. Yes, Morning, Sweet | dit |
| Programmable word/phrase two, e.g. No, Evening, Jerk | dah |

TABLE II

Custom Codes for Letters

| Letters | Custom Codes |
|---|---|
| A | ditdah |
| B | dahditditdit |
| C | dahditdahdit |
| D | dahditdit |
| E | ditdit |
| F | ditditdahdit |
| G | dahdahdahdit |
| H | dahditdah |
| I | dahditdah |
| J | ditdahdahdah |
| K | ditdahditdit |
| L | dahdahdit |
| M | dahdahdahdah |
| N | dahdit |
| O | dahdahdah |
| P | ditdahdahdit |
| Q | dahdahditdah |
| R | ditdahdit |
| S | ditditdit |
| T | dahdah |
| U | ditditdah |
| V | ditditditdah |
| W | ditditdahdah |
| X | dahditditdah |
| Y | dahditdahdah |
| Z | dahdahditdit |

TABLE III

Custom Code for Numbers

| Numbers | Custom Code |
|---|---|
| 0 | dahdahdahdahdah |
| 1 | ditdahdahdahdah |
| 2 | ditditdahdahdah |
| 3 | ditditditdahdah |
| 4 | ditditditditdah |
| 5 | ditditditditdit |
| 6 | dahditditditdit |
| 7 | dahdahditditdit |
| 8 | dahdahdahditdit |
| 9 | dahdahdahdahdit |

TABLE IV

Custom Codes for Punctuations

| Punctuations | Custom Codes |
|---|---|
| / (slash) | dahditdahditdah |
| , (comma) | dahdahditditdah |
| . (period) | dahdahdahditdah |
| ? (question mark) | ditdahditdah |
| : (colon) | ditdahdahditdah |
| ; (semicolon) | ditdahditditdah |
| ! (exclamation) | ditdahditdahdit |
| ( (left parenthesis) | ditditdahditdit |
| ) (right parenthesis) | dahdahditdahdah |
| space | ditditditdit |
| ' (single quote) | dahditdahdahdah |
| " (double quote) | ditdahditdahdah |
| - (hyphen) | ditdahdahdahdit |
| + (plus sign) | dahditditditdah |
| = (equal sign) | ditditdahdahdit |

TABLE V

Morse Codes for Letters

| Letters | Morse Code |
| --- | --- |
| A | ditdah |
| B | dahditditdit |
| C | dahditdahdit |
| D | dahditdit |
| E | dit |
| F | ditditdahdit |
| G | dahdahdit |
| H | ditditditdit |
| I | ditdit |
| J | ditdahdahdah |
| K | dahditdah |
| L | ditdahditdit |
| M | dahdah |
| N | dahdit |
| O | dahdahdah |
| P | ditdahdahdit |
| Q | dahdahditdah |
| R | ditdahdit |
| S | ditditdit |
| T | dah |
| U | ditditdah |
| V | ditditditdah |
| W | ditdahdah |
| X | dahditditdah |
| Y | dahditdahdah |
| Z | dahdahditdit |

TABLE VI

Morse Code for Numbers

| Numbers | Morse Code |
| --- | --- |
| 0 | dahdahdahdahdah |
| 1 | ditdahdahdahdah |
| 2 | ditditdahdahdah |
| 3 | ditditditdahdah |
| 4 | ditditditditdah |
| 5 | ditditditditdit |
| 6 | dahditditditdit |
| 7 | dahdahditditdit |
| 8 | dahdahdahditdit |
| 9 | dahdahdahdahdit |

TABLE VII

Morse Codes for Punctuations

| Punctuations | Morse Codes |
| --- | --- |
| / (slash) | dahditditdahdit |
| , (comma) | dahdahditditdahdah |
| . (period) | ditdahditdahditdah |
| ? (question mark) | ditditdahdahditdit |

In one embodiment, the conventional operational setting selection feature of phone 100/100' is enhanced to facilitate a user in selecting an operational rate for processing and interpreting the encoded representations, e.g. 5 wpm, 13 wpm, 20 wpm and so forth. The different operational rates facilitate usage by users of varying skill levels, from the novice users to the more advanced users.

Preferably, buttons 120 are strategically placed on a side surface of phone 100/100' to facilitate single-handed operation of phone 100/100'. That is, with the side surface placement of buttons 120, a user may e.g. use two fingers of the same hand holding phone 100/100' to manipulate buttons 120 to enter alphanumeric data of a text message to be transmitted by entering their variable length encoded representations of the selected operational encoding scheme. Thus a user may be holding phone 100/100', engage in a verbal conversation, and switch to sending the other calling party a non-verbal text message, and then switch back to verbal conversation, all performed without changing the position of phone 100/100' or altering the manner phone 100/100' is held. Phone 100/100' may be held next to the user's ear or in any arbitrary position if an earpiece or a speaker is used.

For the illustrated embodiments, which are designed for right-handed users, buttons 120 are strategically placed on left side surface 119a of body casing 116 of phone 100/100'. In alternate embodiments, designed for left-handed users, buttons 120 may be strategically placed on right side surface 119b of body casing 116 of phone 100/100' instead. In yet other alternate embodiments, buttons 120 may be placed on the top surface at top end 118a.

Beside side surfaces 119a and 119b, and top end 118a, body casing 116 also has bottom end 118b as well as front surface 117/117'. Note that side surfaces 119a and 119b, top and bottom ends 118a and 118b, and front surface 117/117' are all objectively determined. As illustrated, wireless mobile phone 100/100' also includes display 108/108' for displaying data, including the data corresponding to the variable length encoded representations entered using buttons 102. Accordingly, phone 100/100' necessarily has a reading orientation. By definition, the surface the display is disposed is the front surface. The front surface in turn definitively defines the left side surface and the right side surface.

Further, such a device necessarily has a display orientation, which definitively defines top and bottom ends 118a and 118b. For example, textual data are either rendered from left to right and top to bottom, as denoted by arrows 140a and 140b, as in the case of the English language, or right to left and top to bottom, as denoted by arrows 142a and 142b, as in the case of the Hebrew language, or top to bottom and right to left, as denoted by arrows 142b and 142a, as in the case of the Chinese language. Thus the manner in which textual data are rendered definitively defines which end is the top end, and which end is the bottom end. Moreover, an element A of phone 100/100' will necessarily be considered as above element B of phone 100/100', and element B will necessarily be considered as below or beneath element A, if element A is closer to the objectively determinable top end of phone 100/100' (or element B is closer to the objectively determinable bottom end of phone 100/100').

In various alternate embodiments, in lieu of the employment of two buttons, one single button may be employed instead. For these embodiments, the "dit" and "dah" codes may e.g. be differentiated based on the duration the single button is pressed.

In yet other alternate embodiments, in addition to the single or double "dit" and "dah" buttons provided, at least another second or third button may be provided to facilitate quick entry of a frequently used encoding. In one such alternate embodiment, a second/third button is provide to facilitate a quick entry of the encoding corresponding to a "space" (dahditdahdah for the earlier described custom encoding scheme). Preferably, the "frequently" used encoding may be assigned by the user (like other system preferences).

In yet other alternate embodiments, each "extra" button may be associated with more than one "frequently" used encoding, differentiated e.g. based on the duration the "extra" button is depressed. Further, multiple ones of these "extra"

buttons may also be provided. Again, preferably, the "frequently" used encoding may be assigned by the user (like other system preferences).

Continuing to refer to FIGS. 1a-1b, beside buttons 120 and the complementary logic, phone 100/100' is otherwise intended to represent a broad range of wireless mobile phones, including both the analog as well as the digital types (of all signaling protocols). In addition to buttons 120, the complementary logic, body casing 116/116' and display 108/108' phone 100/100' further includes standard input key pad 102/102' having a number of conventional alphanumeric keys, "talk" and "end talk" buttons 104, cursor control buttons 106, antenna 110/110', ear speaker 112, microphone 214 and adapter interface 122.

The two embodiments differ in the relative disposition of antenna 110/110' to ear speaker 112, and the relative disposition of keypad 102/102' to display 108/108'. In the first embodiment, similar to conventional prior art wireless mobile phones, antenna 110 and ear speaker 112 are both disposed near top end 118a, whereas in the second embodiment, unlike conventional prior art wireless mobile phones, antenna 110' is disposed near bottom end 118b while ear speaker 112 is disposed near top end 118a. Further, in the first embodiment, similar to conventional prior art wireless mobile phones, keypad 102 is disposed in the lower half of phone 100 beneath display 108, whereas in the second embodiment, unlike conventional prior art wireless mobile phones, keypad 102' is disposed in the upper half of phone 100' above display 108'. In other words, except for code buttons 120 and the associated complementary logic of the present invention, the first embodiment represents a wide range of wireless mobile phones known in the art. Similarly, except for code buttons 120 and the associated complementary logic of the present invention, the second embodiment is disclosed in co pending application Ser. No. 09/767,526 filed Jan. 22, 2001, entitled "A Wireless Mobile Phone with Inverted Placement of Antenna and Keypad", which is hereby fully incorporated by reference.

Further, for the illustrated embodiments, each of buttons 120 includes light emitting diodes (LED). The LEDs are employed by the complementary logic to visually echo the variable length encoded representations of the selected operational encoding scheme of letters, numbers and punctuations entered through input keypad 102/102', thereby facilitating a user in learning the more complex encoded representations of the selected operational encoding scheme. In a presently preferred embodiment, the corresponding variable length encoded representations are echoed responsive while the letters, numbers and punctuations are entered via input keypad 102/102'. In various embodiments, the present invention also contemplates the conventional operational setting feature of phone 100/100' will further be enhanced to facilitate enabling/disabling of this "learn mode".

Additionally, as alluded to earlier, phone 100/100' includes adapter interface 122 for removably attaching a variety of accessory devices to phone 100/100'. Among these removably attachable accessory devices include e.g. ear piece (not shown), and vibration device 132. Thus, with the attachment of vibration device 132, the complementary logic may vibrationally output received alphanumeric data through vibrational manifestations of their corresponding variable length encoded representations in accordance with the selected operational encoding scheme. As a result, a user may silently and vibrationally receive a text message.

Figure 2A:
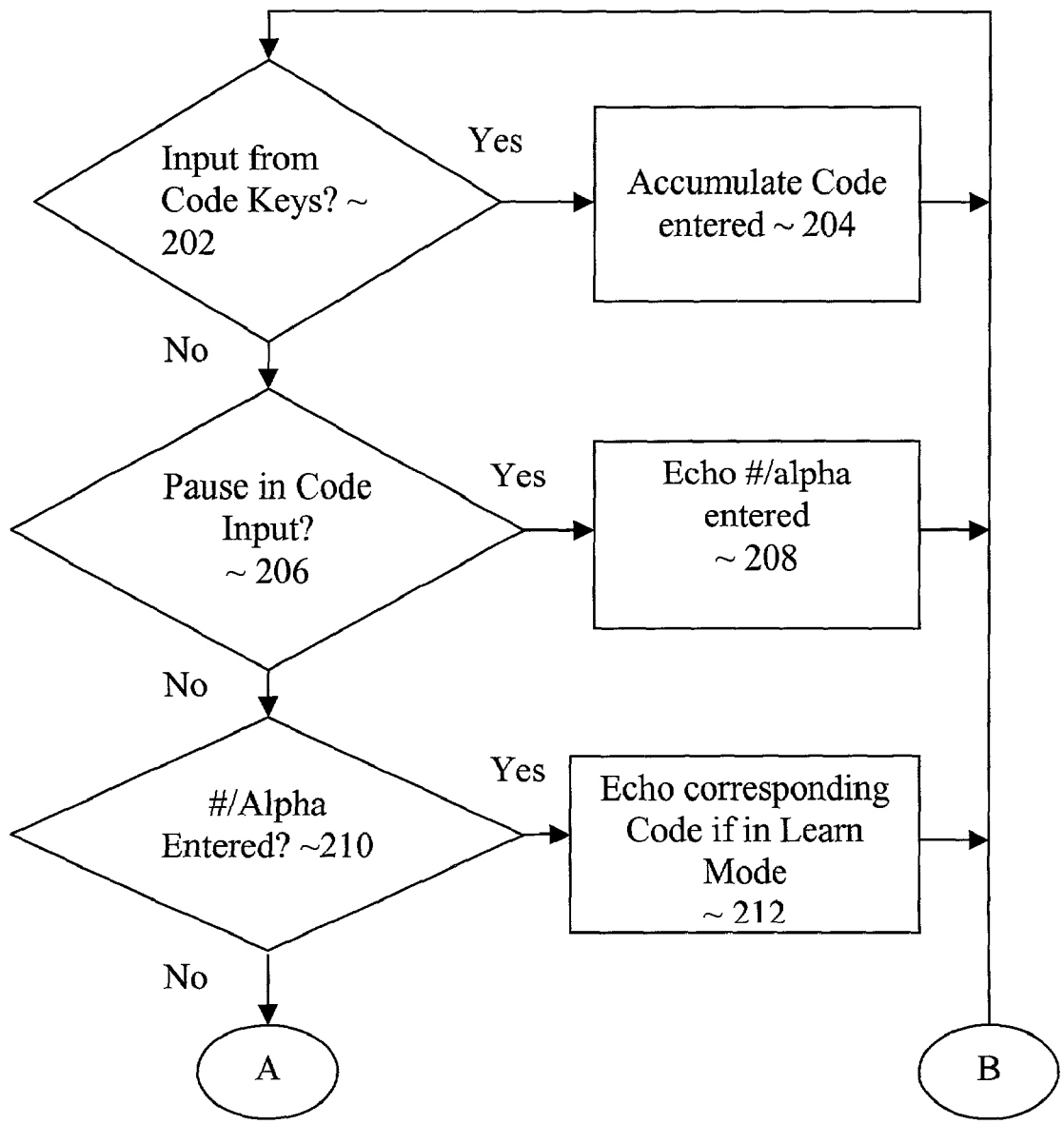
FIGS. 2a-2b illustrate the operational flow of the relevant aspects of the supporting logic provided to the wireless mobile phone of FIG. 1a/1b, in accordance with one embodiment.
Figure 2B:
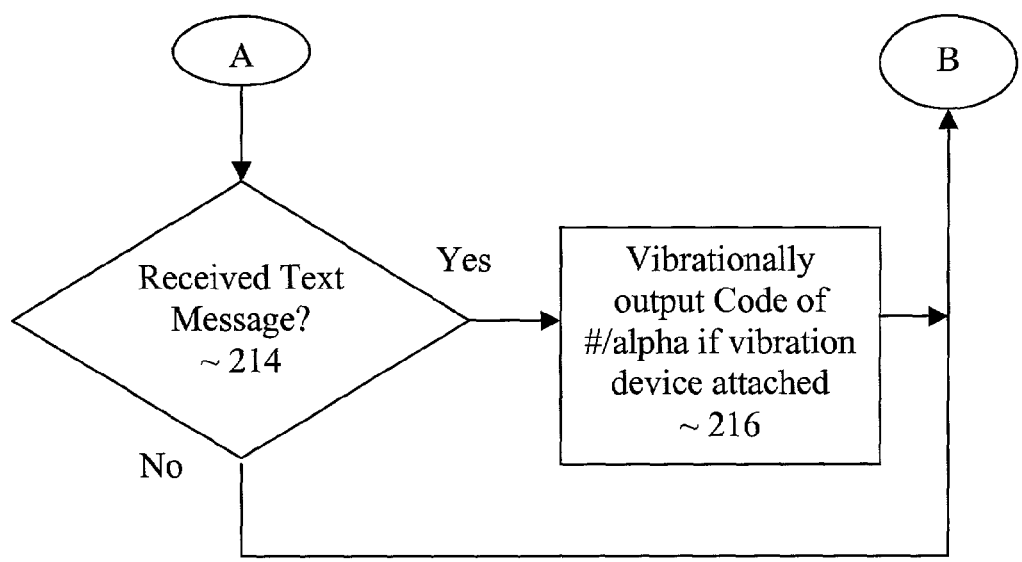

In one embodiments, the encoded representations of the corresponding letters, numbers and punctuations are vibrationally manifested. In other embodiments, where the user has associated one or more words/phrases to one or more of the encoded representations, the complementary logic delays the vibrationally manifestation by the length of the longest assigned word/phrase, to allow determination and potential output of the encoded representations of the assigned words/phrases Referring now to FIGS. 2a-2b, wherein the operational flow (200) of the relevant aspects of the complementary logic is shown. As illustrated, during operation, the complementary logic continuously checks and determines the operational state of phone 100/100', and acts accordingly. For the illustrated embodiment, the complementary logic first checks to determine if an input has been entered using one of the code buttons 120, block 202. If an input has been entered, the complementary logic accumulates the code input received (until a letter, a number or a punctuation has been inputted, per the selected operational encoding scheme), using e.g. an accumulation buffer, block 204.

Back at block 202, if it is determined that an encoded representation has not been just inputted, the complementary logic determines if the operational state is considered to be at a pause after a series of successive code inputs have been entered, block 206. If it is determined that the operational state is at such a pause, the complementary logic maps the accumulated code entered to its corresponding alphanumeric data, and causes the corresponding alphanumeric data (in e.g. its ASCII form) to be injected into the data stream of a current application, block 208. As alluded to earlier, the current application may be a messaging application, i.e. the data stream is a message being formed for transmission. Alternatively, the current application may be an address book application, i.e. the data stream is an address book record to be stored. The complementary logic also causes the corresponding alphanumeric data to be visually echoed on display 108/108' (based on the accumulated encoded representation per the selected operational encoding scheme, since the last "refresh" of the accumulation buffer), block 208. Upon echoing, the complementary logic also "clears" the accumulated code inputs.

On the other hand if back at block 206, it was determined that the operational state is not at such a pause, the complementary logic further determines if alphanumeric data has just been entered through input keypad 102/102', block 210. If it is so determined, and assuming the earlier described "learn mode" is enabled, the complementary logic causes the LEDs of buttons 120 to be lit up accordingly (with a pattern of "dit" and "dah") to visually echo the corresponding codes of the operational encoding scheme of the enteredletters, numbers and punctuations, block 212.

Back at block 210, if it was determined that alphanumeric data has not been just entered through input keypad 102/102', the complementary logic further determines if alphanumeric data has just been received from another device, e.g. another phone, block 214. The complementary logic makes the determination by analyzing the received data stream. If so and a vibration device is attached to phone 100/100', the complementary logic vibrationally output the received alphanumeric data by causing the vibration device to vibrationally manifest the corresponding encoded representations of the operational encoding scheme of the received alphanumeric data, block 216.

In each case, upon accumulating an entered encoded representation (block 204), echoing the corresponding alphanumeric data of the entered encoded representation (block 208), echoing the encoded representation of entered alphanumeric data (block 212), or vibrationally output the encoded representation of received alphanumeric data (block 214), the complementary logic continues operation back at block 202.

Thus, it can be seen from the above description, a user of phone 100/100' may advantageously use the encoded data entry facilities provided to enter and send a text message, by entering the variable length encoded representations of the selected operational encoding scheme, during a call, thereby enabling the user to be able to selectively communicate with the caller/callee in a non-verbal or more private manner. The user of phone 100/100' may also advantageously use the encoded data entry facilities provided to enter address records for an address book inside phone 100/100'.

Figure 3:
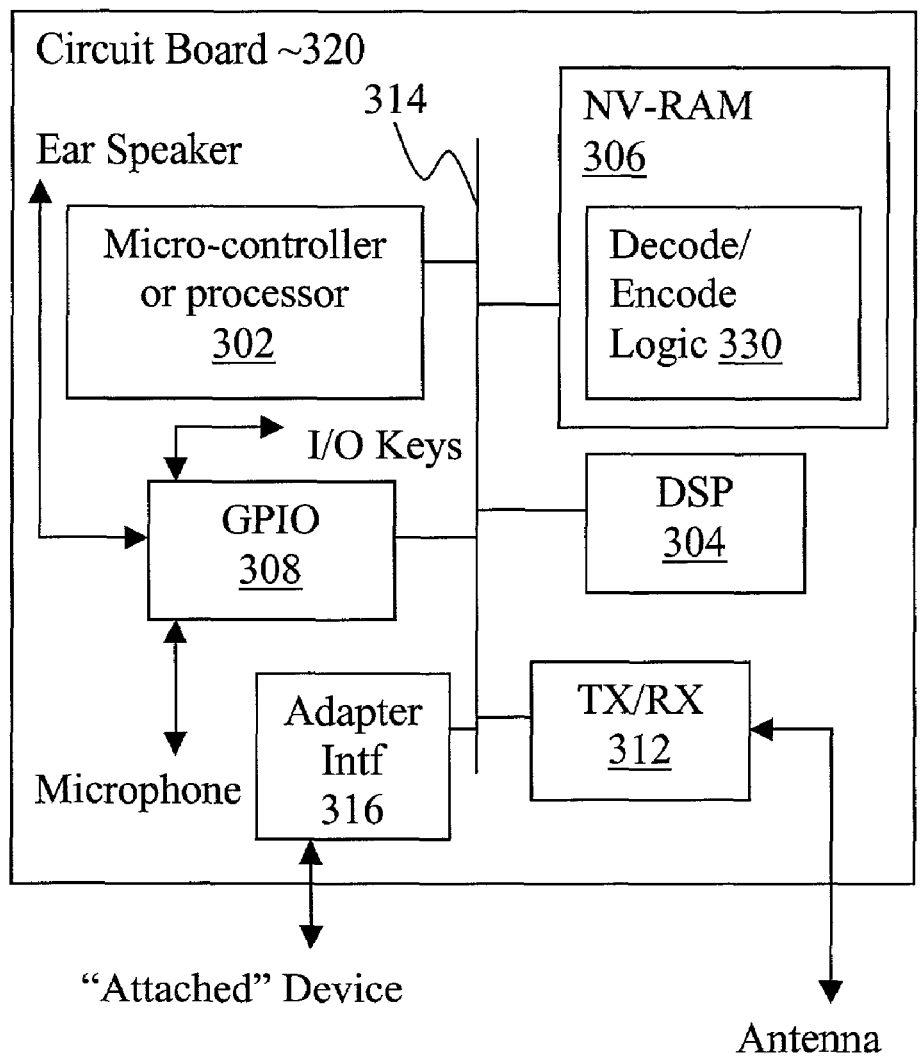
FIG. 3 illustrates an internal component view of the wireless mobile phone of FIG. 1a/1b, in accordance with one embodiment.

FIG. 3 illustrates an architecture view of a wireless mobile phone 300, in accordance with one embodiment. As illustrated, wireless mobile phone 300 includes elements found in conventional mobile client devices, such as micro-controller/processor 302, digital signal processor (DSP) 304, non-volatile memory 306, general purpose input/output (GPIO) interface 308, transmit/receive (TX/RX) 312 (also known as transceiver), and adapter interface 316, coupled to each other via bus 314 and disposed on a circuit board 320. Except for the use of GPIO 308 to also interface code buttons 120, and the use of non-volatile memory 306 to host complementary logic 330, the elements are used to perform their conventional functions known in the art. In particular, TX/RX 312 may support one or more of any of the known signaling protocols, including but are not limited to CDMA, TDMA, GSM, and so forth. Their constitutions are known. Accordingly, the elements will not be further described.

Thus, a wireless mobile phone enhanced to enable its user to enter data in an encoded manner, thereby enabling the user to be able to more naturally communicate a message non-audibly during a call or enter an address record has been described. While the present invention has been described in terms of the above-illustrated embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. An apparatus comprising:
a body casing having a plurality of surfaces;
an input keypad disposed on a first surface of said body casing to facilitate entry of alphanumeric data;
a first button and a second button disposed on a second surface of said body casing; and
complementary logic to
facilitate entry of alphanumeric data and user programmable phrases in encoded representations of a variable length encoding scheme using one or more of said first button and second button, the variable length encoding scheme having a plurality of codes of various code lengths, each code of said plurality representing corresponding alphanumeric data, and each corresponding alphanumeric data being internally represented in a fixed length binary form,
wherein the shortest code of the variable length encoding scheme represents a first user selectable phrase comprising a plurality of alphanumeric characters, the first user selectable phrase being selected by a user from among a plurality of phrases for representation by the shortest code, said shortest code representing said first user selectable phrase in its entirety, and
wherein the second shortest code of the variable length encoding scheme represents a second user selectable phrase comprising a plurality of alphanumeric characters, the second user selectable phrase being selected by a user from among a plurality of phrases for representation by the second shortest code, said second shortest code representing said second user selectable phrase in its entirety;
facilitate the user in assigning the first user selectable phrase selected by the user to the shortest code of the variable encoding scheme and in assigning the second user selectable phrase selected by the user to the second shortest code of the variable encoding scheme;
in response to user entry of the shortest code using only the first button, inputting the internal representation of the first user selectable phrase in its entirety into a current application, the internal representation being in the fixed length binary form; and
in response to user entry of the shortest code using only the second button, inputting the internal representation of the second user selectable phrase in its entirety into a current application, the internal representation being in the fixed length binary form.

2. The apparatus of claim 1, wherein said apparatus further comprises a display, and said complementary logic further echoes on said display the first user selectable phrase in its entirety in response to input, through said at least first button, of said shortest code.

3. The apparatus of claim 1, wherein said at least first button is optically associated with a light source, and said complementary logic further causes said light source associated with said at least first button to be energized to light said first button to visually echo encoded representations of letters, numbers or punctuations entered through said input keypad.

4. The apparatus of claim 1, wherein said apparatus further comprises a transceiver to send and receive signals, and an adapter interface to removably attach a device capable of vibrating to said apparatus, and to vibrationally output alphanumeric data or user selectable phrases received through said transceiver, for touch comprehension, using said removably attached device capable of vibrating.

5. The apparatus of claim 4, wherein said alphanumeric data or user selectable phrases are vibrationally outputted through vibrational manifestation of encoded representations of the variable length encoding scheme.

6. The apparatus of claim 1, wherein said complementary logic further supports user specification of user selectable phrases having one or more words.

7. The apparatus of claim 1, wherein an alphanumeric character is selectable by a user for representation by a third code of the variable length encoding scheme, the alphanumeric character being selected from a group of punctuations consisting of a space, a slash, a comma, a period, a question mark, a colon, a semi-colon, a left parenthesis, a right parenthesis, and an exclamation.

8. The apparatus of claim 7, wherein said third code representing the selected punctuation is one of

| Selected Punctuation | Code |
|---|---|
| / (slash) | dahditdahditdah |
| , (comma) | dahdahditditdah |
| . (period) | dahdahdahditdah |
| ? (question mark) | ditdahditdah |
| : (colon) | ditdahdahditdah |
| ; (semicolon) | ditdahditditdah |
| ! (exclamation) | ditdahditdahdit |

-continued

| Selected Punctuation | Code |
| --- | --- |
| ( (left parenthesis) | ditditdahditdit |
| ) (right parenthesis) | dahdahditdahdah |
| space | ditditditdit |
| ' (single quote) | dahditdahdahdah |
| " (double quote) | ditdahditdahdah |
| - (hyphen) | dahdahdahdahdit |
| + (plus sign) | dahditditditdah |
| = (equal sign) | ditditdahdahdit. |

9. The apparatus of claim 1, wherein an alphanumeric character is selectable by a user for representation by a third code of the variable length encoding scheme, the alphanumeric character being a letter and the third code consisting of

| Letters | Custom Codes |
| --- | --- |
| E | ditdit |
| G | dahdahdahdit |
| H | dahditdah |
| I | ditdahdah |
| K | ditdahditdit |
| L | dahdahdit |
| M | dahdahdahdah |
| T | dahdah |
| W | ditditdahdah. |

10. The apparatus of claim 1, wherein said complementary logic further maps said first shortest code to said first word or phrase.

11. The apparatus of claim 1, wherein said apparatus further comprises at least an additional third button for use in conjunction with the first and the second button to enter a third code of the variable encoding scheme, wherein the third code is assigned to a third user selectable word or phrase having a plurality of alphanumeric characters, the third code being input using at least said additional third button.

12. The apparatus of claim 1, wherein said first and second surfaces are different surfaces of the body casing.

13. The apparatus of claim 12, wherein said first surface is a front surface of the body casing, and said second surface is a second surface of the body casing.

14. The apparatus of claim 1, wherein said first and second surfaces are the same surface of the body casing.

15. An apparatus comprising:
a transceiver to send and receive signals;
an adapter interface to removably attach a device capable of vibrating to said apparatus; and
complementary logic in support of said transceiver and said adapter interface to
determine that a data stream received via said transceiver from another device comprises one or more alphanumeric data,
vibrationally output the alphanumeric data received via said transceiver through vibrational manifestation of encoded representations of the received alphanumeric data for touch comprehension, using the removably attached device capable of vibrating, wherein the vibrationally manifested encoded representations are codes of a variable length encoding scheme, the variable length encoding scheme having a plurality of codes of various code lengths, each code of said plurality representing corresponding alphanumeric data, and each corresponding alphanumeric data being internally represented in a fixed length binary form, wherein
the shortest code of the variable length encoding scheme represents a first user selectable phrase, the first user selectable phrase being selected by a user for representation in its entirety by said shortest code, and said first user selectable phrase comprising a plurality of alphanumeric characters, and
the second shortest code of the variable length encoding scheme represents a second user selectable phrase selected by a user for representation in its entirety by said second shortest code, and said second user selectable phrase comprising a plurality of alphanumeric characters, and
facilitate the user in assigning the first user selectable phrase selected by the user to the shortest length code of the variable encoding scheme and in assigning the second user selectable phrase selected by the user to the second shortest length code of the variable encoding scheme, wherein said first user selectable phrase and said second user selectable phrase are selectable by the user from among a plurality of phrases,
in response to user entry of the shortest code using only the first button, inputting the internal representation of the first user selectable phrase in its entirety into a current application, the internal representation being in the fixed length binary form, and
in response to user entry of the shortest code using only the second button, inputting the internal representation of the second user selectable phrase in its entirety into a current application, the internal representation being in the fixed length binary form.

16. The apparatus of claim 15, wherein said apparatus further comprises a display, and said complementary logic further supports echoing on said display said alphanumeric data or user selectable phrases received through said transceiver.

17. The apparatus of claim 15, wherein said encoded representations comprise a code representing a punctuation selected from a group of punctuations consisting of a space, a slash, a comma, a period, a question mark, a single quote, a double quote, a hyphen, a colon, a semi-colon, a left parenthesis, a right parenthesis, and an exclamation.

18. The apparatus of claim 17, wherein said code representing the selected punctuation is a selected one of

| Selected Punctuation | Code |
| --- | --- |
| / (slash) | dahditdahditdah |
| , (comma) | dahdahditditdah |
| . (period) | dahdahdahditdah |
| ? (question mark) | ditdahditdah |
| : (colon) | ditdahdahditdah |
| ; (semicolon) | ditdahditditdah |
| ! (exclamation) | ditdahditdahdit |
| ( (left parenthesis) | ditditdahditdit |
| ) (right parenthesis) | dahdahditdahdah |
| space | ditditditdit |
| ' (single quote) | dahditdahdahdah |
| " (double quote) | ditdahditdahdah |
| - (hyphen) | dahdahdahdahdit |
| + (plus sign) | dahditditditdah |
| = (equal sign) | ditditdahdahdit. |

19. The apparatus of claim 15, wherein said encoded representations comprise a code representing a letter selected from a group of letters consisting of

| Letters | Custom Codes |
|---|---|
| E | ditdit |
| G | dahdahdahdit |
| H | dahditdah |
| I | ditdahdah |
| K | ditdahditdit |
| L | dahdahdit |
| M | dahdahdahdah |
| T | dahdah |
| W | ditditdahdah. |

20. The apparatus of claim 15, wherein said alphanumeric data are received in fixed length binary representations of a fixed length character encoding scheme, and said complementary logic maps each of the received fixed length binary representations to a corresponding encoded representation of the variable length encoding scheme.

21. An apparatus comprising:
a body casing having a plurality of surfaces;
an input keypad disposed on a first of said surfaces having a plurality of alphanumeric keys;
a light source;
a first and a second button disposed on a second of said surfaces, optically associated with the light source; and
complementary logic in support of
entry, through the input keypad, of alphanumeric data and user selectable phrases selected by a user for encoding, said user selectable phrases being selectable by the user from among a plurality of phrases,
entry, using said first and second button, of alphanumeric data and user selectable phrases through entry of encoded representations of the alphanumeric data and the user programmable phrases, wherein the encoded representations are codes of a variable length encoding scheme, the variable length encoding scheme having a plurality of codes of various code lengths, each code of said plurality representing corresponding alphanumeric data, and each corresponding alphanumeric data being internally represented in a fixed length binary form,
wherein the shortest code of the variable length encoding scheme represents a first user programmable phrase selected by the user, said first user programmable phrase being represented in its entirety by the shortest code, wherein said first user programmable phrase comprises a plurality of alphanumeric characters, and
wherein the second shortest code of the variable length encoding scheme represents a second user programmable phrase selected by the user, said second user programmable phrase being represented in its entirety by the second shortest code, wherein said second user programmable phrase comprises a plurality of alphanumeric characters;
assignment of the first user selectable phrase selected by the user to the shortest length code of the variable encoding scheme, the first user selectable phrase being selected by the user for association with said shortest length code of the variable length encoding scheme,
assignment of the second user selectable phrase selected by the user to the second shortest length code of the variable encoding scheme, the second user selectable phrase being selected by the user for association with said second shortest length code of the variable length encoding scheme,
in response to user ent of the first user selectable phrase through said input keypad, energizing of said light source to light only said first button to visually echo said first shortest code, and
in response to user entry of the second user selectable phrase through said input keypad, energizing of said light source to light only said second button to visually echo said second shortest code.

22. The apparatus of claim 21, wherein said complementary logic further supports user specification of user selectable phrases having one or more words.

23. The apparatus of claim 21, wherein said encoded representations comprise a code representing a punctuation selected from a group of punctuations consisting of a slash, a comma, a period, a question mark, a space, a single quote, a double quote, a hyphen, a plus sign, an equal sign, a colon, a semi-colon, a left parenthesis, a right parenthesis, and an exclamation.

24. The apparatus of claim 23, wherein said code representing the selected punctuation is a selected one of

| Selected Punctuation | Code |
|---|---|
| / (slash) | dahditdahditdah |
| , (comma) | dahdahditditdah |
| . (period) | dahdahdahditdah |
| ? (question mark) | ditdahditdah |
| : (colon) | ditdahdahditdah |
| ; semicolon | ditdahditditdah |
| ! (exclamation) | ditdahditdahdit |
| ( (left parenthesis) | ditditdahditdit |
| ) (right parenthesis) | dahdahditdahdah |
| space | ditditditdit |
| ' (single quote) | dahditdahdahdah |
| " (double quote) | ditdahditdahdah |
| - (hyphen) | ditdahdahdahdit |
| + (plus sign) | dahditditditdah |
| = (equal sign) | ditditdahdahdit. |

25. The apparatus of claim 21, wherein said encoded representations comprise a code representing a letter selected from a group of letters consisting of

| Letters | Custom Codes |
|---|---|
| E | ditdit |
| G | dahdahdahdit |
| H | dahditdah |
| I | ditdahdah |
| K | ditdahditdit |
| L | dahdahdit |
| M | dahdahdahdah |
| T | dahdah |
| W | ditditdahdah. |

26. The apparatus of claim 21, wherein said alphanumeric data are entered in fixed length binary representations of a fixed length character encoding scheme, and said complementary logic maps each of the entered fixed length binary representations to a corresponding encoded representation of the variable length encoding scheme.

27. The apparatus of claim 21, wherein said first and second surfaces are different surfaces of said body casing, and said light source comprises one or more light emitting diodes (LED) proximally disposed with the first button.

28. In a wireless mobile phone, a method comprising:
receiving encoded representations of a variable length encoding scheme of alphanumeric data and user programmable phrases having one or more words, said encoded representations entered using one or more of a first button and a second button disposed on a top or side surface of the mobile phone, said variable length encoding scheme comprising a plurality of codes of various code lengths, each code of said plurality representing corresponding alphanumeric data, and each corresponding alphanumeric data being internally represented in a fixed length binary form,
wherein the shortest code of the variable length encoding scheme represents a first user programmable phrase selected by a user for association with said shortest code, said first user programmable phrase comprising a plurality of alphanumeric characters, and
wherein the second shortest code of the variable length encoding scheme represents a second user programmable phrase selected by a user for association with said second shortest code, said second user programmable phrase comprising a plurality of alphanumeric characters, and
wherein the shortest code represents the first user programmable phrase in its entirety, and the second shortest code represents said second user programmable phrase in its entirety, and
said mobile phone also having an input keypad disposed on a front surface to facilitate entry of alphanumeric data;
electrically generating, in response to entry of said shortest code by a single activation of said first button, a signal corresponding to the fixed length digital binary form of said first user programmable phrase,
electrically generating, in response to entry of said second shortest code by a single activation of said second button, a signal corresponding to the fixed length binary form of said second user programmable phrase, and
inputting the fixed length binary form of said first and second user programmable phrase into a data stream of a current application.

29. The method of claim 28, wherein said method further comprises visually echoing on a display of said mobile phone said alphanumeric data or user programmable phrases entered through entry of their variable length encoded representations of said variable length encoding scheme using one or more of said first button and second button.

30. The method of claim 28, wherein each of said at least a first button is optically associated with a light source, and said method further comprises energizing said light source associated with said first button and second button to light one or more of said first button and second button to visually echo the variable length encoded representations of said variable length encoding scheme of letters, numbers, punctuations, and user programmable phrases entered through said input keypad.

31. The method of claim 28, wherein said mobile phone further comprises an adapter interface to removably attach a capable of vibrating device to said mobile phone, and said method further comprises vibrationally outputting the variable length encoded representations of the alphanumeric data and user programmable phrases received through a transceiver of said mobile phone for touch comprehension, using said removably attached capable of vibrating device.

32. A method of communication comprising:
placing a call to a callee using a wireless mobile phone;
communicating verbally with the callee using the wireless mobile phone; and
at selected moments of desired increased privacy during the call, communicating non-verbally to the callee a user selected word or phrase by
entering an encoded representation of the user selected word or phrase through one or more of a first button and a second button disposed on a top or side surface of the wireless mobile phone, said user selected word or phrase comprising one or more words to be transmitted to the callee and the encoded representation being a code in accordance with a variable length encoding scheme having a plurality of codes of various code lengths, and sending the user selected word or phrase to the callee using messaging application,
wherein the shortest code of the variable length encoding scheme represents a first user selected word or phrase, said first user selected word or phrase comprising a plurality of alphanumeric characters selected by the user, said first user selected word or phrase being selected by the user to be encoded in its entirety by the shortest code, and
wherein the second shortest code of the variable length encoding scheme represents a second user selected word or phrase, said second user selected word or phrase comprising a plurality of alphanumeric characters selected by the user, said second user selected word or phrase being selected to be encoded in its entirety by the second shortest code
wherein a single activation of the first button causes the first user selected word or phrase to be inputted into the messaging application, and a single activation of the second button causes the first user selected word or phrase to be inputted into the messaging application.

33. The method of claim 32, wherein the method further comprises mapping the variable length encoded representations of the user selected words or phrases to corresponding conventional fixed length digital character set representations, in accordance with the variable length encoding scheme.

34. An apparatus comprising:
a transceiver to send and receive signals;
a body casing having a front surface and a side surface;
an input keypad disposed on said front surface of said body casing to facilitate entry of alphanumeric data and user programmable phrases having one or more words;
a first button disposed on said side surface of said body casing;
a second button disposed on said side surface of said body casing adjacent to said first button;
means coupled to the first and second buttons and to the transceiver to facilitate entry of alphanumeric data and user programmable phrases via corresponding code representations of a variable length coding scheme, using said first and second buttons, the variable length encoding scheme comprising a plurality of codes of various code lengths, each code of said plurality representing corresponding alphanumeric data, and each corresponding alphanumeric data being internally represented in a fixed length binary form, and transmission of said alphanumeric data and user programmable phrases using said transceiver,
wherein the shortest code of the variable length encoding scheme represents a first user programmable phrase selected by a user, said first user programmable phrase being selectable by the user from among a plurality of user programmable phrases and being represented in its entirety by the shortest code, and comprising a plurality of alphanumeric characters, and wherein the second shortest code of the variable length encoding scheme represents a second user programmable phrase selected by a user, said second user programmable phrase being selectable by the user from among a plurality of user programmable phrases and being represented in its entirety by the second shortest code, and comprising a plurality of alphanumeric characters; and means coupled to the input keypad to facilitate assignment of one or more of the user programmable phrases to the shortest length codes means coupled to the first and second button to facilitate inputting, in response to entry of the shortest code using the first button, the internal representation of the first user selectable phrase in its entirety into a current application, and, in response to entry of the shortest code using only the second button for inputting the internal representation of the second user selectable phrase in its entirety into a current application.

35. The apparatus of claim 34, wherein said apparatus further comprises a display, and said means further echoes on said display alphanumeric data or user programmable phrases represented by code representations entered using said first and second buttons.

36. The apparatus of claim 34, wherein said apparatus further comprises an adapter interface to removably attach a device capable of vibrating to said apparatus, and to vibrationally output alphanumeric data and user programmable phrases received through said transceiver for touch comprehension, using said removably attached capable of vibrating device.

37. The apparatus of claim 36, wherein said alphanumeric data and user programmable phrases are vibrationally outputted through vibrational manifestation of the code representations of the alphanumeric data and user programmable phrases.

38. In a wireless mobile phone, a method comprising:
receiving code representations of alphanumeric data and user programmable phrases, said user programmable phrases having one or more words and being selectable by the user from among a plurality of user programmable phrases, the code representations being entered using a first and a second button disposed on a top or side surface of the mobile phone, said mobile phone also having an input keypad disposed on a front surface to facilitate entry of said alphanumeric data or user programmable phrases, the variable length coding scheme having a plurality of codes of various code lengths, wherein the shortest code of the variable length encoding scheme represents a first user programmable phrase selected by a user, the first user programmable phrase being represented in its entirety by the shortest code, wherein said first user programmable phrase comprises a plurality of alphanumeric characters, and wherein the second shortest code of the variable length encoding scheme represents a second user programmable phrase selected by a user, the second user programmable phrase being represented in its entirety by the second shortest code, wherein said second user programmable phrase comprises a plurality of alphanumeric characters; and in response, electrically generating signals corresponding to digital representations of said alphanumeric data or user programmable phrases entered through entry of their code representations using said first and second buttons, inputting the signals into a messaging application, and transmitting said alphanumeric data or user programmable phrases by electro-magnetically transmitting said generated signals using the messaging application.

39. The method of claim 38, wherein said method further comprises visually echoing on a display of said mobile phone said alphanumeric data or user programmable phrases entered through entry of their code representations using said first and second buttons.

40. The method of claim 38, wherein said mobile phone further comprises an adapter interface to removably attach a capable of vibrating device to said mobile phone, and said method further comprises vibrationally outputting alphanumeric data or user programmable phrases received through a transceiver of said mobile phone for touch comprehension, using said removably attached capable of vibrating device.

* * * * *

UNITED STATES PATENT AND TRADEMARK OFFICE
CERTIFICATE OF CORRECTION

PATENT NO. : 7,831,208 B2
APPLICATION NO. : 09/975287
DATED : November 9, 2010
INVENTOR(S) : Nelson et al.

It is certified that error appears in the above-identified patent and that said Letters Patent is hereby corrected as shown below:

Column 14, line 4 reads "in response to user ent of the first user selectable phrase" should read
-- in response to user entry of the first user selectable phrase --

Column 28, line 35 reads "corresponding to the fixed length digital binary form of" should read
-- corresponding to the fixed length binary form of --

Column 17, line 23 reads "using only the second button for inputting" should read
-- using only the second button, for inputting --

Signed and Sealed this
Fifteenth Day of March, 2011

David J. Kappos
*Director of the United States Patent and Trademark Office*